US006934324B2

(12) United States Patent
Yamazaki

(10) Patent No.: US 6,934,324 B2
(45) Date of Patent: Aug. 23, 2005

(54) ZERO VALUE-DETECTING CIRCUIT

(75) Inventor: Motohiro Yamazaki, Tokyo (JP)

(73) Assignee: Nippon Precision Circuits Inc., Tokyo (JP)

( * ) Notice: Subject to any disclaimer, the term of this patent is extended or adjusted under 35 U.S.C. 154(b) by 783 days.

(21) Appl. No.: 09/934,237

(22) Filed: Aug. 21, 2001

(65) Prior Publication Data

US 2002/0025010 A1 Feb. 28, 2002

(30) Foreign Application Priority Data

Aug. 29, 2000 (JP) ....................................... 2000-259036

(51) Int. Cl.$^7$ .......................... H04L 25/00; H04L 27/00

(52) U.S. Cl. ........................ 375/216; 375/247; 375/342; 341/143; 341/144

(58) Field of Search ................................ 375/216, 247, 375/342; 341/143, 144, 77

(56) References Cited

U.S. PATENT DOCUMENTS 5,682,162 A * 10/1997 Hamasaki et al. .......... 341/144
5,889,483 A * 3/1999 Tagami et al. .............. 341/143

* cited by examiner

*Primary Examiner*—Phuong Phu
(74) *Attorney, Agent, or Firm*—Jordan and Hamburg LLP

(57) ABSTRACT

Provided is a circuit that has a simple circuit configuration and can detect zero values in a 1-bit digital signal irrespective of a recording medium such as SACD. DSD data forming the 1-bit digital signal are successively sent to a shift register (1) whose number of stages corresponds to the number of bits of an idle pattern such as "101010101" which appears when assuming a zero value. For example, the shift register (1) is an 8-bit shift register. An adder (2) sums up the values at each stages of the shift register (1). A zero decision circuit (4) produces an output indicating decision of zero if the sum value is half of the number of bits. A counter (5) keeps counting while the output indicating zero decision is being delivered. If the count value of the counter exceeds a given value, the counter produces an output indicating detection of a zero value. In consequence, zero values in a 1-bit digital signal can be detected with a simple circuit configuration, regardless of the idle pattern that varies among different recording media such as SACDs.

7 Claims, 3 Drawing Sheets

ZERO VALUE-DETECTING CIRCUIT

BACKGROUND OF THE INVENTION

1. Field of the Invention

The present invention relates to a zero value-detecting circuit for detecting zero values in a 1-bit digital signal, known as DSD (Direct Stream Digital) data or the like recorded on a SACD (Super Audio Compact Disc), i.e., a 1-bit digital signal obtained by encoding an analog signal by delta sigma modulation.

2. Description of the Related Art

In SACD and the like, an analog signal is encoded into a 1-bit digital signal consisting of a data stream of binary values, i.e., 1 and 0 values, that are continuous in the direction of the time axis, and is recorded. Such a 1-bit digital signal is demodulated into an analog signal by a 1-bit DAC (Digital to Analog Converter). As even if the original analog signal contains a stream of zero values, the converted 1-bit digital signal, because of the characteristics of delta sigma modulation, unlike PCM (Pulse Code Modulation) data, does not has a stream of zero values, but has an idle pattern (e.g., 10101010, 10010110, or the like) intrinsic to a delta sigma modulator which is used for sampling. This causes noises in the demodulated analog signal. One procedure for preventing this noise consists of detecting zero values in the analog signal and muting them if zero values are found. For example, Japanese Patent Laid-Open No. 335956/1998 discloses a technique for demodulating a 1-bit digital signal into an analog signal by a low-pass filter, detecting zero values in the analog signal, and performing muting.

The technique disclosed in the above-cited Japanese Laid-Open Publication requires a low-pass filter to demodulate a digital signal into an analog signal for zero value detection, which increases the scale of the analog circuit and causes problems such as accuracy compensation and others.

The idle pattern indicating zero values in the analog signal is intrinsic to a delta sigma modulator. That is, the pattern differs among individual recording media such as SACDs. If an idle pattern is simply detected by pattern matching in the stage of a digital signal to detect zero values, the detection means is inevitably specialized for a specific medium, which has a disadvantage of lack of flexibility.

Furthermore, if the low-pass filter is replaced by a digital filter, the problem that the circuit scale is increased cannot be circumvented.

SUMMARY OF THE INVENTION

Accordingly, it is an object of the present invention to provide a circuit that is simple in configuration but capable of detecting zero values in a 1-bit digital signal, irrespective of the recording medium such as SACD.

A zero value-detecting circuit in accordance with the present invention preferably has an addition means for receiving a 1-bit digital signal produced by encoding an analog signal by delta sigma modulation and taking the sum of the 1-bit digital signals of a given number of samples, a first decision means for making a decision as to whether the analog signal has a zero value based on the output value from the addition means and for producing a first output signal, and a second decision means for producing a second signal indicating that the analog signal assumes a zero value if the first decision means keeps delivering the first signal for a given period of time.

Preferably, the number of samples corresponds to N times (where N is an integer equal to or greater than 1) the number of bits of the repeating pattern appearing in the 1-bit digital signal by the aforementioned delta sigma modulation corresponding to the zero values in the analog signal.

It is desired that the addition means comprise a shift register having stages corresponding in number to the number of samples for which the 1-bit digital signal is received and an adder for summing up the values in the respective stages of the shift register. The first decision means delivers the first output signal described above when the sum value obtained by the adder corresponds to half of the number of samples described above.

The above-described addition means preferably comprises a shift register having stages corresponding in number to the number of samples for which the 1-bit digital signal is received, a comparison means for comparing the value of the 1-bit digital signal applied to the shift register with the value in the final stage of the shifter register and generating a clock signal when they are different, and a counting means for counting UP in response to the clock signal when the 1-bit digital signal applied to the shift register is at a first logical level and counting DOWN when the 1-bit digital signal applied to the shift register is at a second level, the counting means having a bit number equal to or greater than half of the number of samples described above. The first decision means delivers the first signal when the count value obtained by the counter corresponds to half of the number of samples.

DESCRIPTION OF THE PREFERRED EMBODIMENTS

Figure 1:
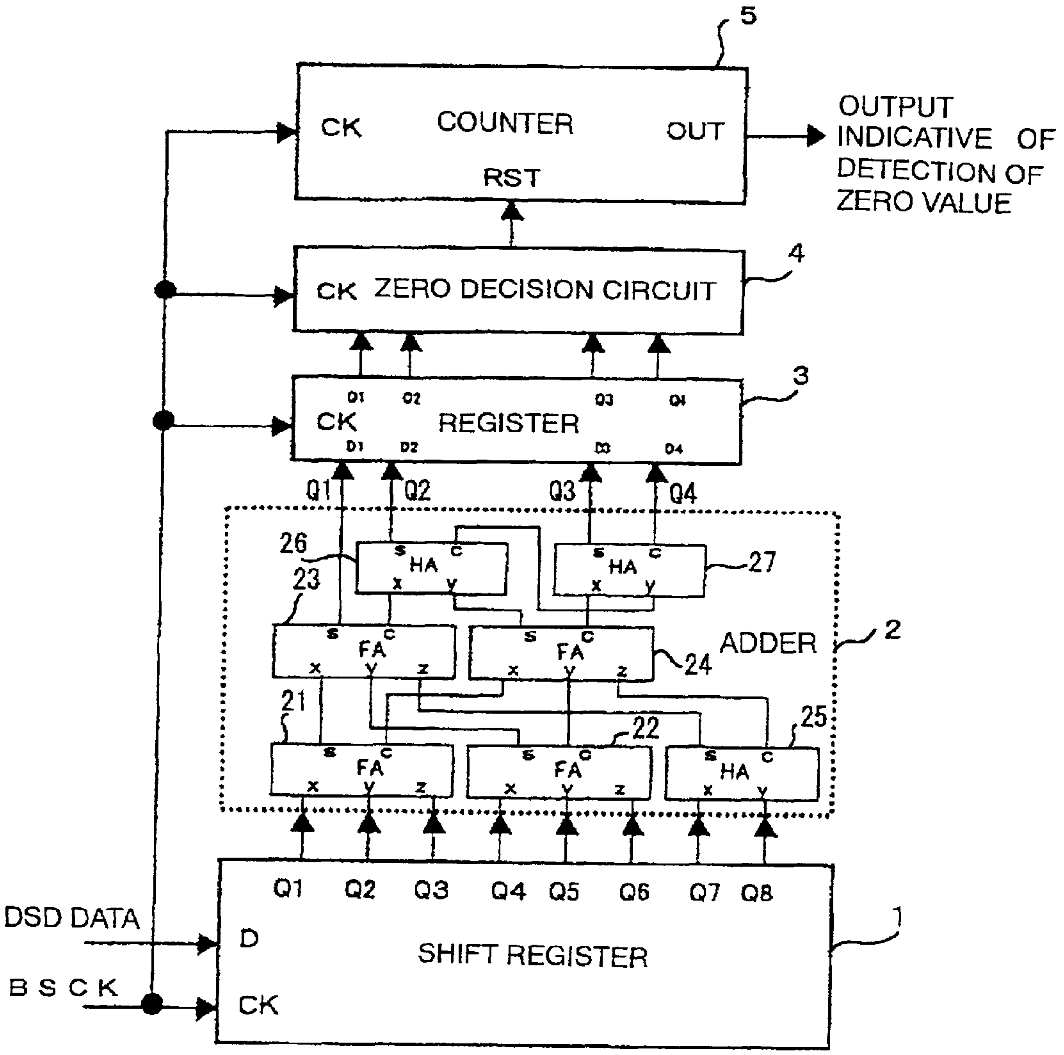
FIG. 1 is a block diagram illustrating the configuration of a zero value-detecting circuit in accordance with one embodiment of the present invention.

Now the present invention are hereinafter described in detail based on embodiments by referring to the accompanying drawings. FIG. 1 is a block diagram illustrating the configuration of a zero value-detecting circuit in accordance with a first embodiment of the present invention. In the present embodiment, zero values are detected from DSD (Direct Stream Digital) data that is a 1-bit digital signal recorded on a SACD (Super Audio Compact Disc).

A shift register 1 consists of eight stages receiving DSD data. The shift register shifts the DSD data entered from a data terminal D by one bit to the following stage in response to each operating clock BSCK (bit clock of the DSD data) arriving at a clock terminal CK. Since the idle pattern that is a repeating pattern indicating zero values of the DSD data is "10101010", "10010110", or the like, the number of stages of the shift register 1 is adapted to correspond to the number of bits of the idle pattern. Detection of the idle pattern is enabled when the sum value of the stages is coincident with the sum value of the bits of the idle pattern.

An adder 2 sums up the values at each stage of the shift register 1, and consists of full adders 21–24 and half adders 25–27. The full adders 21–24 are identical with each other.

Each full adder sums up values applied to input terminals x, y, and z and delivers the sum value from an output terminal S and from a carry output terminal C. The half adders 25–27 are identical with each other. Each half adder sums up values entered to input terminals x and y and delivers the sum value from an output terminal S and from a carry output terminal C. For the sake of convenience, the input terminals x, y, z of these full and half adders are denoted by x, y, and z, while the output terminals thereof are indicated by S. Similar terminals will be indicated by similar symbols. These conventions also apply to input terminals D1–D4, output terminals Q1–Q8, and so on of components described later. The input terminals x, y, and z of the full adder 21 are connected with the output terminals Q1–Q3, respectively, of the first through third stages of the shift register 1. The input terminals x, y, and z of the full adder 22 are connected with the output terminals Q4–Q6, respectively, of the fourth through sixth stages of the shift register 1. The input terminals x and y of the half adder 25 are connected with the output terminals Q7 and Q8, respectively, of the seventh and eighth stages of the shift register 1. The input terminals x, y, and z of the full adder 23 are connected with the output terminals S, respectively, of the full adders 21, 22 and of the half adder 25. The input terminals x, y, and z of the full adder 24 are connected with the carry output terminals C, respectively, of the full adders 21, 22 and of the half adder 25. The input terminals x and y of the half adder 26 are connected with the carry output terminal C of the full adder 23 and the output terminal S of the full adder 24, respectively. The input terminals x and y of the half adder 27 are connected with the carry output terminals C, respectively, of the full adder 24 and the half adder 26. The output terminal S of the full adder 23, the output terminal S of the half adder 26, the output terminal S of the half adder 27, and its carry output terminal C are taken as the output terminals Q1–Q4, respectively, of the adder 2. The values at the output terminals Q1–Q4 are binary numerals and represented from the least significant bit. These binary numerals indicate the sum values obtained by summing up the values at each stage of the shift register 1.

A register 3 is a 4-bit register and has input terminals D1–D4 receiving the values from the output terminals Q1–Q4, respectively, of the adder 2. These received values are latched according to the operating clock BSCK arriving at its input terminal CK and are delivered from the output terminals Q1–Q4.

A zero decision circuit 4 judges that there are zero values when the output terminals Q1–Q4 of the register 3 deliver "0", "0", "1", and "0", respectively, and produce an output indicative of decision of zero. That is, the decision circuit judges that there are zero values when the sum value obtained from the stages of the shift register 1 is coincident with the sum value "4" ("100" in binary notation) obtained from the bits of the idle pattern indicating zero values in the DSD data.

A counter 5 keeps counting the operating clock BSCK while the zero decision circuit 4 continues to deliver an output indicative of decision of zero, and produces an output indicating detection of a zero value if a given count value is exceeded. The DSD is judged to have a zero value by this output indicating detection of a zero value. This is used for control of a 1-bit DAC (Digital to Analog Converter) (not shown) for demodulation of the DSD data and for a low-pass filter or the like. For instance, the analog signal is muted in response to the output indicative of detection of a zero value.

The operation of the present embodiment is next described.

The DSD data are successively given to the shift register 1 in synchronism with the operating clock BSCK. Eight-bit data preceding the newest DSD data are delivered from the output terminals Q1–Q8 of the each stage of the shift register 1. The adder 2 sums up the values of the output terminals Q1–Q8 and sends the sum value to the register 3. The register 3 holds the sum value in synchronism with the operating clock BSCK and the zero decision circuit 4 produces an output indicating decision of zero if the sum value is "4". This output indicating decision of zero cancels the resetting of the counter 5. This counter 5 begins to count the operating clock BSCK. If the DSD data repeats an idle pattern, the sum value "4" delivered from the adder 2 is maintained. If the count value of the counter 5 exceeds a given value, the counter 5 produces an output indicating detection of a zero value.

If the repetition of the idle pattern breaks, and if the DSD data is biased to "1" or "0", the sum value becomes different from "4". The output indicating decision of zero breaks, resetting the counter 5. The output indicating detection of a zero value is interrupted.

As described thus far, although the idle pattern consists of an array of "1"s and "0"s depending on the delta sigma modulation used for sampling of DSD data such as "10101010", "10010110", or the like, in the present embodiment, we have paid attention to the fact that the idle pattern appears at every certain number of each sample and that the sum value of each samples at certain number of samples corresponds to half of the certain number of bits, and have detected the pattern. In other words, the certain number of samples of the DSD data is averaged, to observe half of its duty cycle. The values at respective stages of the shift register 1 that correspond to the certain number of samples ("8" in this embodiment) are summed up, and if the state where the sum value is "4" persists for a given period of time, the output indicating detection of a zero value is produced. Consequently, detection of zero values can be effected without relying on the idle pattern. Furthermore, detection of zero values can be accomplished with a simple structure without using any low-pass filter of analog or digital construction. Since zero values of DSD data can be detected by a simple digital arithmetic processing, a digital filter or 1-bit DAC can be controlled using this output indicative of detection of a zero value. For example, at zero values of DSD data, mute control or the like in which repeating data consisting of 0s and 1s are applied to a 1-bit DAC can be performed without being affected by filter calculation or by the analog performance of the DAC.

Figure 2:
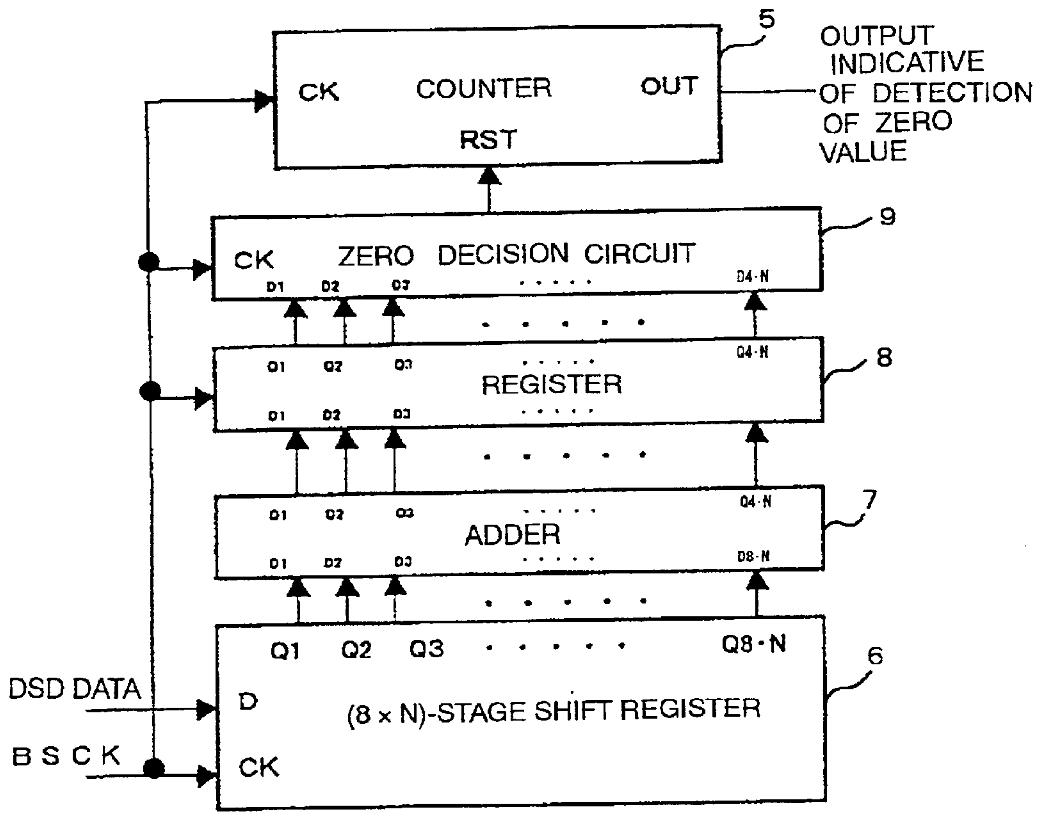
FIG. 2 is a block diagram illustrating a configuration obtained by generalizing the zero value-detecting circuit in accordance with one embodiment of the invention.

In the above-described first embodiment, the number of stages of the shift register is eight, however, the present invention is not limited to this, the number of stages may be to N times the number of bits (where N is an integer equal to or greater 1) of the idle pattern. For example, as shown in FIG. 2, a shift register 6 with 8×N stages is used. An adder 7 sums up the values at 8×N stages and delivers a sum value from a (4×N)-bit output terminal. A register 8 is a (4×N)-bit register and latches the sum value derived from the adder 7. A zero value decision circuit 9 produces an output indicating decision of a zero value if the sum value from the register 8 is 4×N. Note that the counter 5 is similar to the counterpart shown in FIG. 1 and indicated by the same numeral as in FIG. 1. In the following figures, the same components as their counterparts of FIG. 1 will be indicated by the same numerals. Although the configuration is modified as shown in FIG. 2, it operates similarly to the configuration shown in FIG. 1 and thus yields advantages similar to those produced by the configuration of FIG. 1.

Figure 3:
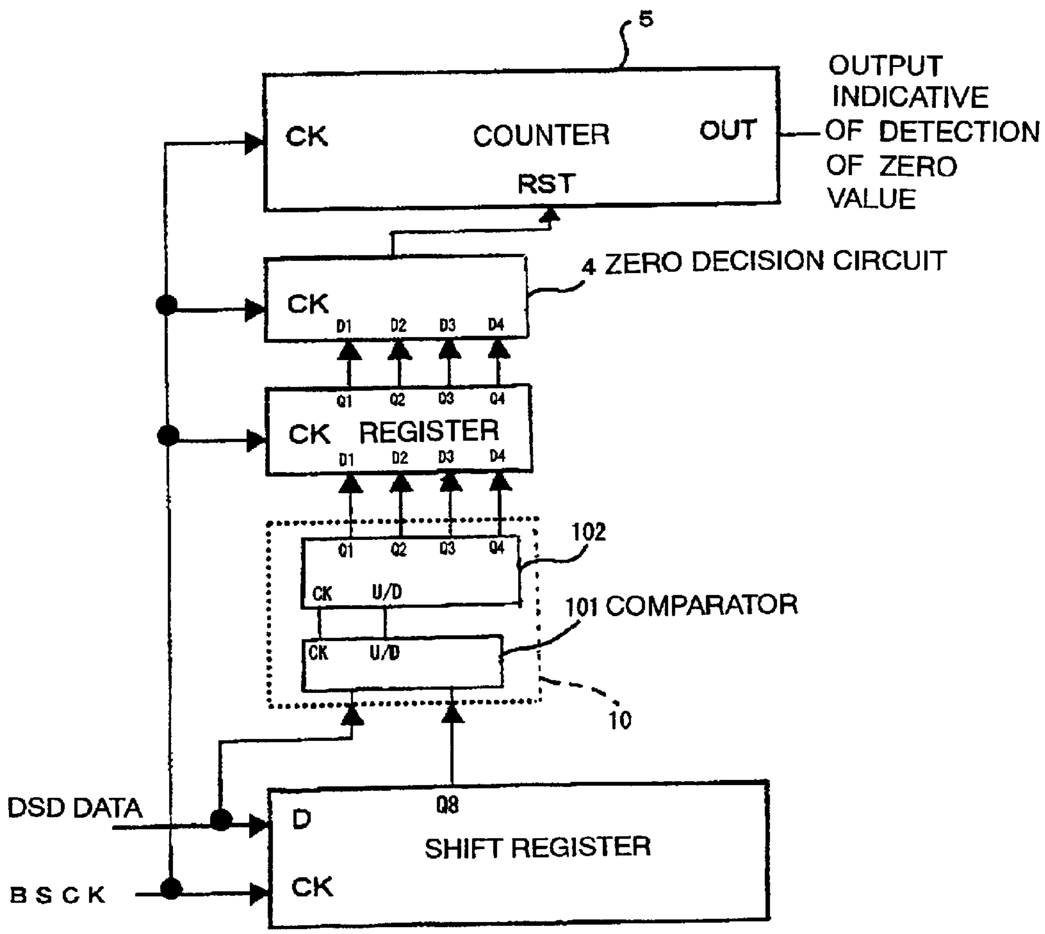
FIG. 3 is a block diagram illustrating the configuration of a zero value-detecting circuit in accordance with another embodiment of the invention.

Another embodiment of the present invention is next described by referring to the block diagram of FIG. 3.

In the above-described embodiment, the adder is made up of full adders and half adders, however, the invention is not limited to this construction. The adder may be constructed as described in the present embodiment. An adder 10 consists of a comparator 101 and an up/down counter 102. The comparator circuit 101 compares the value at an input terminal D of the first stage of the shift register 1 with the value at the output terminal Q8 at the final stage and delivers one clock pulse from a terminal CK if they are different. When the output terminal Q8 of the shift register 1 is "0", "1" is delivered from the terminal U/D. When the output terminal Q8 is "1", "0" is delivered from the terminal U/D. The up/down counter 102 counts UP clock pulses produced by the comparator 101 when the terminal U/D of the comparator 101 is "1" and counts DOWN them when the terminal U/D is "0". The configuration is similar to the configuration shown in FIG. 1 except for these points.

The operation of the present embodiment is next described.

It is first assumed that "0"s are put in all the stages of the shift register 1, an idle pattern "10101010" is repeatedly entered and the count value of the up/down counter 102 is "0". If the first "1" is entered into the shift register 1, the comparator circuit 101 compares value "1" at the input terminal D of the first stage of the shift register 1 and value "0" at the output terminal Q8 of the final stage, producing a clock pulse at the terminal CK to set the terminal U/D at "1". The up/down counter 102 receives "1" at the terminal U/D and counts clock pulses received at the terminal CK. The count value is set to "1". If the next "0" is entered into the shift register 1, the comparator circuit 101 compares value "0" at the input terminal D of the first stage of the shift register 1 and value "0" at the output terminal Q8 of the final stage. Since both agree, no clock pulse is produced from the terminal CK. The count value of the up/down counter 102 remains at "1". Similarly, if an idle pattern is subsequently entered into the shift register 1 up to "1010101", the count value of the up/down counter 102 becomes "4". The output terminals Q1–Q4 of the up/down counter 102 become "0", "0", "1", and "0", respectively. These are sent to the zero decision circuit 4 via the register 3. The zero decision circuit 4 produces an output indicating decision of zero. If the following "0" is entered into the shift register 1, and if an idle pattern is entered up to "10101010", the up/down counter 102 retains its count value at "4". The zero decision circuit 4 maintains its output indicating decision of zero.

If the forefront "1" of "10101010" of the next idle pattern is entered into the shift register 1, the forefront "1" of the first idle pattern is delivered from the output terminal Q8 of the final stage of the shift register 1. In response to the coincidence between them, the comparator circuit 101 produces no clock pulse. The up/down counter 102 maintains its count value at "4". The zero decision circuit 4 retains the output indicating decision of zero. Subsequently, as long as the idle pattern of "10101010" continues, the zero decision circuit 4 maintains the output indicating decision of zero. If the count value of the counter 5 increases beyond a given count value, the circuit produces an output indicating detection of zero value.

If the input of the idle pattern breaks, the following operation takes place. Assuming that "0", "1", "0", "1", "0", "1", "0", and "1" are loaded in the first through final stages, respectively, of the shift register 1, and that the idle pattern breaks and values as given by "11 . . . ", for example, are successively entered into the shift register 1, the comparator circuit 101, in response to the forefront "1", produces no clock pulse and the count value of the up/down counter is maintained at "4". In response to the next "1", the comparator circuit 101 produces a clock pulse, setting the terminal U/D to "1". The up/down counter 102 counts UP until the counter value reaches "5". In response to this, the zero decision circuit 4 no longer produces the output indicating decision of zero. The counter 5 is reset and the output indicating detection of a zero value breaks.

As described thus far, in the present embodiment, too, the output indicating detection of zero is produced if the sum value of all the bits of the idle pattern "10101010" is "4". If this output indicating decision of zero persists for a given period of time, an output indicating detection of a zero value is delivered. That is, this embodiment yields advantages similar to those produced by the above-described first embodiment.

It is noted that again in the present embodiment, the number of stages of the shift register is not limited to 8. The number of stages may be N times the number of bits of the idle pattern, where N is an integer equal to or greater than 1. Although not specifically shown in, the present invention may be embodied in the following arrangement: the shift register of (8×N) stages shown in FIG. 2 may be used, the comparator circuit 101 may compare the output from the final stage, or the (8×N)th stage, and the input to the first stage, the up/down counter may consist of a counter made up of 4×N stages, and the register 3 and the zero decision circuit 4 may be replaced by the register 8 and the zero decision circuit 9 shown in FIG. 2.

In the present invention, zero values can be detected without relying on an idle pattern. Furthermore, detection of zero values can be accomplished with a simple structure not using an analog or digital low-pass filter. Since zero values in DSD data can be detected by simple digital arithmetical processing, it is possible to control the following stage digital filter or 1-bit DAC, using the output indicating detection of a zero value. For example, at zero values of DSD data, mute control or the like in which repeating data consisting of 0s and 1s are applied to a DAC can be performed without being affected by filter calculation or by the analog performance of the DAC.

What is claimed is:

1. A zero value-detecting circuit, comprising:

an addition means for receiving a 1-bit digital signal produced by encoding an analog signal by delta sigma modulation and taking the sum of said 1-bit digital signals of a given number of samples applied immediately before;

a first decision means for making a decision as to whether said analog signal has a zero value based on the output value from said addition means and for producing a first output signal; and a second decision means for producing a second output signal indicating that said analog signal assumes a zero value when said first decision means keeps delivering said first signal for a given period of time, wherein said given number of samples corresponds to N times a number of bits of a repeating pattern appearing in said 1-bit digital signal and corresponding to said delta sigma modulation when said analog signal assumes a zero value, where N is an integer greater than 1.

2. A zero value-detecting circuit, comprising:

an addition means for receiving a 1-bit digital signal produced by encoding an analog signal by delta sigma modulation and taking a sum of said 1-bit digital signals of a given number of samples applied immediately before;

a first decision means for making a decision as to whether said analog signal has a zero value based on the output value from said addition means and for producing a first output signal; and a second decision means for producing a second output signal indicating that said analog signal assumes a zero value when said first decision means keeps delivering said first signal for a given period of time, wherein:

said given number of samples corresponds to N times the number of bits of a repeating pattern appearing in said 1-bit digital signal and corresponding to said delta sigma modulation when said analog signal assumes a zero value, where N is an integer equal to or greater than 1; and said addition means comprises a shift register having stages corresponding in number to said given number of samples for which said 1-bit digital signal is received and an adder for summing up values at each stage of said shift register, and wherein said first decision means produces said first signal when a sum value obtained by said adder corresponds to half of said given number of samples.

3. A zero value-detecting circuit, comprising:

an addition means for receiving a 1-bit digital signal produced by encoding an analog signal by delta sigma modulation and taking the sum of said 1-bit digital signals of a given number of samples applied immediately before;

a first decision means for making a decision as to whether said analog signal has a zero value based on the output value from said first addition means and for producing a first output signal; and a second decision means for producing a second output signal indicating that said analog signal assures a zero value when said first decision means keeps delivering said first signal for a given period of time, wherein:

said given number of samples corresponds to N times the number of bits of a repeating pattern appearing in said 1-bit digital signal and corresponding to said delta sigma modulation when said analog signal assumes a zero value, where N is an integer equal to or greater than 1; and said addition means comprises a shift register having stages corresponding in number to said number of samples for which said 1-bit digital signal is received, a comparison means for comparing the value of the 1-bit signal entered into said shift register and the value at the final stage of said shift register and producing a clock signal if they are different, and a counting means of a bit number more than half of said given number of samples, said counting means counting UP in response to said clock signal when the 1-bit digital signal entered into said shift register at a first logical level and counting DOWN when the 1-bit digital signal applied into said shaft register is at a second level, and wherein said first decision means produces said first signal when a count value obtained by said counter corresponds to half of said given number of samples.

4. The zero value detecting circuit of claim 1 wherein said number of bits of the repeating pattern is 8.

5. The zero value detecting circuit of claim 4 wherein said first decision means determines the analog signal has a zero value when the sum is equal to half said given number of samples.

6. The zero value detecting circuit of claim 2 wherein said number of bits of the repeating pattern is 8.

7. The zero value detecting circuit of claim 3 wherein said number of bits of the repeating pattern is 8.

* * * * *